United States Patent [19]

Smelcer

[11] Patent Number: 4,856,550

[45] Date of Patent: Aug. 15, 1989

[54] CONDENSATE TRAP ON A CONDENSING GAS-FIRED FURNACE

[75] Inventor: Jimmy C. Smelcer, Carrollton, Tex.

[73] Assignee: Lennox Industries Inc., Carrollton, Tex.

[21] Appl. No.: 175,266

[22] Filed: Mar. 30, 1988

[51] Int. Cl.⁴ ............................................. F16T 1/20
[52] U.S. Cl. ............................... 137/192; 126/99 R; 126/110 R
[58] Field of Search ......................... 126/110 C, 99 R; 137/192, 132, 314, 409

[56] References Cited

U.S. PATENT DOCUMENTS

| | | | |
|---|---|---|---|
| 1,316,171 | 9/1919 | Marion | 137/192 |
| 4,527,584 | 7/1985 | Miller | 137/192 |
| 4,603,680 | 8/1986 | Dempsey et al. | 126/99 R X |
| 4,627,460 | 12/1986 | Eising | 137/192 |
| 4,685,486 | 8/1987 | Yokoyama | 137/192 X |

Primary Examiner—Larry Jones
Attorney, Agent, or Firm—Allegretti & Witcoff, Ltd.

[57] ABSTRACT

The present invention pertains to a condensate trap for a condensing furnace comprising a housing having an inlet adapted to be connected to a condensing heat exchanger, an outlet for flue gas and an outlet for condensate. The housing has a chamber therein, a valve seat defining an opening from the chamber, a float valve in the chamber adapted to close the opening, and a drain orifice in the outlet for condensate forming a dam to prevent negative pressure from undesirably dislodging the float valve from the opening. The drain orifice is constructed and arranged to retain condensate at a level higher than that of the bottom of the valve seat.

10 Claims, 1 Drawing Sheet

U.S. Patent      Aug. 15, 1989      4,856,550
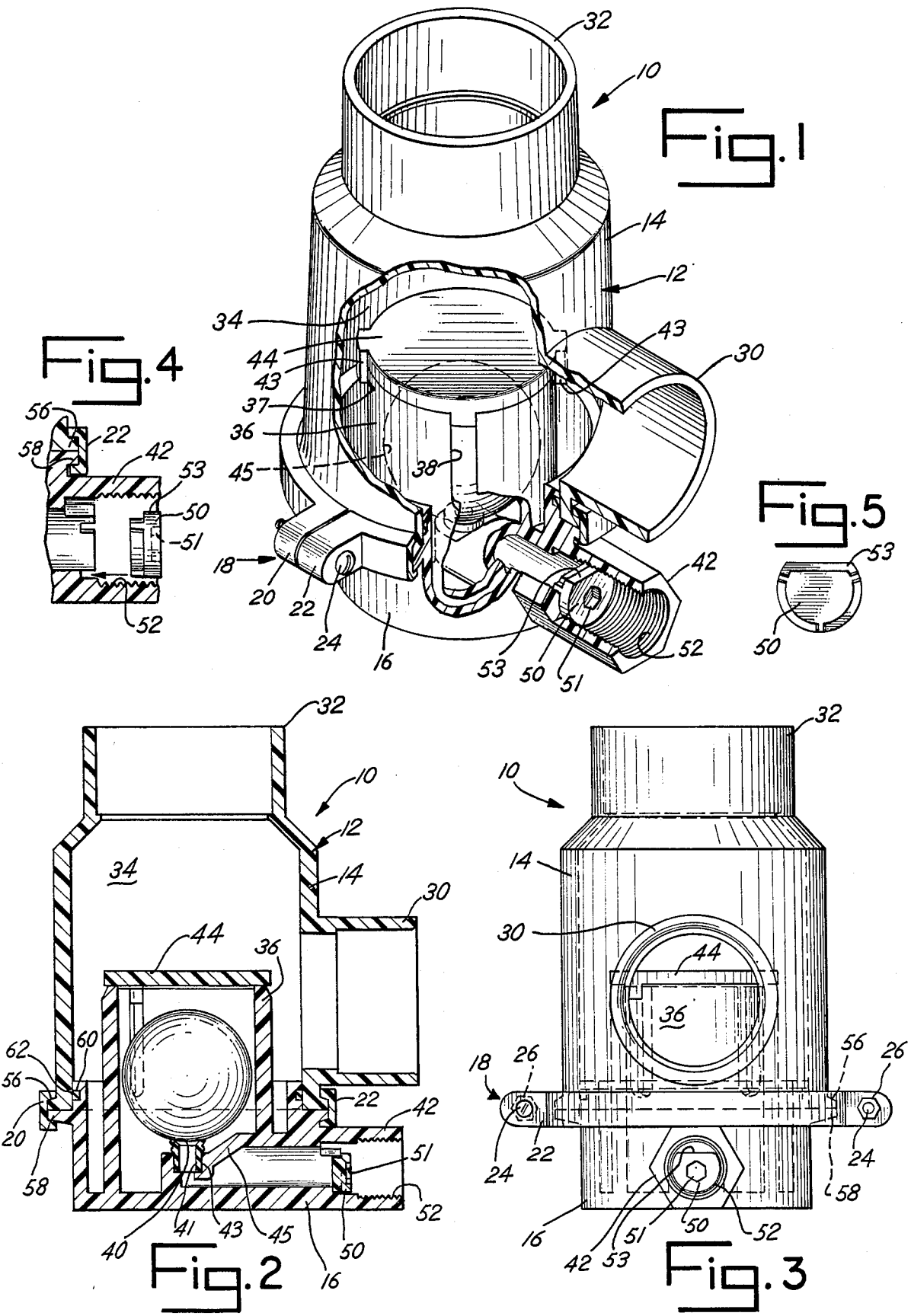

CONDENSATE TRAP ON A CONDENSING GAS-FIRED FURNACE

BACKGROUND OF THE INVENTION

This invention relates to a condensate drain leg assembly or drain trap for a condensing combustion apparatus.

Recently, the pulsating combustion process has been adapted for devices such as high energy efficient residential water heaters and gas fired furnaces. In gas-fired furnaces utilizing the combustion process, gas and air enter the combustion chamber via flapper control valves and mix in the combustion chamber. A spark is used to ignite the gas and air in the combustion chamber initially. Positive pressure from the combustion process within the combustion chamber closes the flapper control valves and forces exhaust gas down a tail pipe extending from the combustion chamber. The exhaust gas or combustion product leaving the combustion chamber create a negative pressure. This opens the flapper control valves to draw gas and air into the combustion chamber. This new gas air charge is ignited by residual combustion in the combustion chamber. No spark is needed for the second ignition. The process repeats itself without continued use of the spark plug or purge air blower. From the tail pipe, the exhaust gases pass to an exhaust decoupler, which is part of the sound reduction system of the gas-fired furnace. The exhaust gas is cooled from about 700° F. to about 350° F. The exhaust gas from the exhaust decoupler is forced through a condensing coil. As the temperature of the exhaust gas reaches the dew point in the condensing coil, water is condensed from the gases allowing reclaimation of the latent heat of combustion.

A drain leg assembly has been provided, as shown for example in Cherington Pat. No. 4,479,482, to separate flue gases from the condensate discharged from condensing furnace. The drain leg assembly of the type shown in the Cherington patent has been referred to as a P-trap. A drain vent was associated with the outlet drain leg assembly in order to vent the condensate outlet to the atmosphere.

The Eising Pat. No. 4,627,460 suggests providing a condensate discharge device for a condensing apparatus which includes a housing with a plastic ball therein to prevent escape of gas from the housing. When condensate accumulates above a predetermined level in the housing of Eising, the ball will float to permit the discharge of condensate from a condensate outlet while preventing discharge of the exhaust gas through said condensate outlet. The Eising condensate discharge device includes a vent tube or drain vent associated with the condensate outlet in order to vent same to the atmosphere.

Other patents show traps with ball valves. For example, Callicott 1,374,079 and Kieselbach 1,789,706 show steam traps. Wesson 2,021,342 reveals a vacuum preventing valve. Holtman 2,325,956 pertains to a device for preventing back flow in liquid carrying lines. Powers 3,209,738 shows a device for draining condensed water vapor from an automotive crank case ventilation system. None of these patents relates to a condensate drain leg assembly for a condensing device and none suggests the structure of the present invention.

An object of the present invention is to provide an improved condensate drain leg assembly for use with a condensing gas-fired furnace.

Another object of the present invention is to provide an improved condensate drain leg assembly or condensate trap for a condensing furnace or like device which incorporates a drain orifice for forming a dam in the condensate outlet to stabilize the float valve in the condensate drain leg assembly and prevent negative pressure from undesirably unseating or dislodging the float valve.

A further object of the present invention is to provide an improved condensate drain leg assembly which incorporates a drain orifice for forming a dam in the condensate outlet to prevent air from being drawn back into the condensate drain leg assembly and undesirably unseating the float valve in the condensate drain leg assembly.

Another object of the present invention is to provide an improved condensate drain leg assembly for a condensing furnace which includes a housing having a chamber with an outlet opening therein, a float valve adapted to close the outlet opening, a condensate outlet extending generally perpendicularly from the bottom of the housing assembly and a drain orifice in the condensate outlet forming a dam for maintaining a condensate level at least as high as the bottom of the outlet opening to prevent undesirable noise.

Still another object of the invention is to provide a condensate drain leg assembly that is compact so that it is better able to be accommodated within a condensing furnace.

A further object of the present invention is to provide a compact, durable, and relatively inexpensive condensate drain leg assembly that may be easily field assembled and installed in a condensing furnace.

Other objects and advantages will be made more apparent hereinafter.

BRIEF DESCRIPTION OF THE DRAWING

There is shown in the drawing a presently preferred embodiment of the present invention wherein like numerals in the various views refer to like elements and wherein:

FIG. 1 is a perspective view, with parts broken away for clarity, of a condensate drain leg assembly or condensate trap for a condensing gas-fired furnace embodying the present invention;

FIG. 2 is a vertical cross section through the condensate drain leg assembly;

FIG. 3 is a front elevation view of the condensate drain leg assembly;

FIG. 4 is a detail view illustrating the insertion of the drain orifice into position in the condensate outlet of the condensate drain leg assembly; and FIG. 5 is a rear view of the drain orifice.

DETAILED DESCRIPTION OF THE PRESENT INVENTION

The present invention is adapted to be used with a condensing furnace disposed in a basement or other appropriate area in a residence or commercial facility to be heated. In Cherington Pat. No. 4,479,482 there is shown a typical condensing unit installation. The inventive device of this application is intended to be substituted for the type of drain leg assembly shown in the Cherington Pat. No. 4,479,482.

The condensate drain leg assembly or trap 10 comprises a housing 12 that is generally cylindrical in shape and has a top portion 14 detachably secured to a bottom portion 16 by suitable fastening means 18. Preferably the fastening means 18 comprise half clamp segments 20, 22 joined together at each side by bolts 24 and nuts 26 to secure the half clamp segments in place on the adjoining flanges of the top portion 14 and bottom portion 16 of housing 12.

An inlet 30 in the top portion 14 is connected to the condensing coil of the condensing furnace (not shown) for receiving flue gases and condensate therefrom. Flue gases may be discharged to a vent through outlet 32 in top portion 14. Condensate will be collected in the chamber or reservoir 34 within housing 12.

Disposed in chamber 34 is a cylindrical housing 36 having slots 38 in the sides thereof for permitting communication between chamber 34 and the interior of cylindrical housing 36. An opening 40 defined in valve seat 41 in the bottom of the housing 36 is adapted to communicate with outlet 42 in the bottom portion 16 of housing 12. The valve seat 41, which is made from a resilient material, for example, rubber, is disposed within a hole 43 in wall 45 in bottom portion 16.

As best seen in FIGS. 1 and 2, the cylindrical housing 36 and the wall 45 are formed integrally within the bottom portion 16 of housing 12. Wall 60 extends above flange 58 on bottom portion 16. The exterior of wall 60 has a groove on the exterior surface for receiving an O-ring 62, which seals between the adjacent mating surface of the top portion 14 and bottom portion 16. The half clamp segments 24, 26 are each essentially U-shaped in cross section, with the U facing inwardly so as to engage the adjacent flanges 56, 58 on the top portion 14 and bottom portion 16, respectively of housing 12 (see FIGS. 1–3).

Ball float valve 45 is retained within the housing 36 and is adapted to close the opening 40. Cap 44 is detachably secured to housing 36 by the cooperative engagement of tabs 43 depending at each side from copy 44 with recesses 37 on the sides of housing 36 so as to retain ball float valve 45 within housing 36 in shipment and in use.

Housing 12 and ball float valve 45 are preferably made from a strong inert plastic, such as polyvinyl chloride.

The bottom surface of bottom portion 16 is flat and the bottom of outlet 42 lies essentially in a common plane with the bottom surface. This helps achieve a lower profile for the condensate trap so that it can be positioned compactly in the bottom of a surface. The condensate can exit from the condensate trap at the lowest possible level. Condensate trap 10 is compact and has a low profile as compared to prior D-trap assemblies used for condensing furnaces.

Turning to FIGS. 2, 3, 4 and 5, there is better shown the drain orifice or dam 50 in the outlet 42 which functions to retain condensate in the outlet passage 52 and preclude negative pressure from the combustion process from undesirably unseating the ball float valve 45. The drain orifice 50 is inserted into outlet 42 (as shown in FIG. 4) until it is fixed in the outlet passage 52 (as shown in FIGS. 1 and 2). The drain orifice 50 is constructed and arranged to block or dam a part of the outlet passage 52. The flattened top of the drain orifice 50 is above the bottom of valve seat 41 in the bottom portion 16 of housing 36 and is horizontally oriented, as best shown in FIGS. 1 and 3.

With reference to FIG. 3, it is seen that the top 53 of the drain orifice 50 extends substantially horizontally and provides a relatively small opening for discharge of condensate from outlet 42. A hexagonal or like non-circular recess 51 is provided in the exterior of surface of the drain orifice 50 to help facilitate placement and proper orientation of the drain orifice 50 in the outlet passage 52. It will be understood a complementary non-circular tool may be inserted into recess 51 to rotate the drain orifice 53 until the flat top 53 is horizontal.

A drain vent (not shown) is provided in the conduit from the outlet 42 to vent the condensate to the atmosphere or to a separate drain in the event the conduit is blocked downstream from the condensate drain trap. Such drain vent was used by the assignee of the present application with the condensate drain leg assembly of the G14 Gas Furnace and does not constitute a part of the present invention.

While a presently preferred embodiment of the present invention has been shown and described, it will be understood that modifications may be embodied within the scope of the following claims.

What is claimed:

1. A condensate trap for a condensing pulsating combustion gas-fired furnace comprising a housing having an inlet adapted to be connected to a condensing heat exchanger, an outlet for flue gas and an outlet for condensate, said housing having a chamber therein, an opening defined in the chamber, a float valve in the chamber adapted to close the opening, and a drain orifice in the outlet for condensate forming a dam to prevent negative pressure from undesirably dislodging the float valve from the opening, said housing being comprised of two portions detachably connected to one another for allowing access for cleaning and inspection and also for allowing rotatable adjustment of one portion with respect to the other.

2. A condensate trap as in claim 1 wherein the float valve comprises a generally spherical ball.

3. A condensate trap as in claim 1 wherein said opening is defined in a valve seat.

4. A condensate trap as in claim 1 wherein said housing has a wall with a hole therein, and a valve seat in said hole defining said opening.

5. A condensate trap as in claim 3 wherein the drain orifice is constructed and arranged to retain condensate at a level higher than that of the bottom of the valve seat.

6. A condensate trap as in claim 1 wherein the two portions are detachably connected by clamp means comprising clamp sections joined by fastening means.

7. A condensate trap as in claim 1 wherein a cylinder within the housing forms said chamber, said float valve being disposed in said cylinder, and a float cap secured to said cylinder for confining said float valve therein.

8. A condensate trap as in claim 5 wherein the drain orifice has a substantially flat top.

9. A condensate trap as in claim 8 wherein the flat top is disposed generally horizontally in the outlet for condensate.

10. A condensate trap as in claim 9 wherein the drain orifice has a noncircular recess in the exterior surface thereof to facilitate proper orientation of the drain orifice in the outlet for condensate.

* * * * *